May 23, 1961  TŌRU MIYASAKA  2,985,083
FILM FRAME COUNTING MEANS

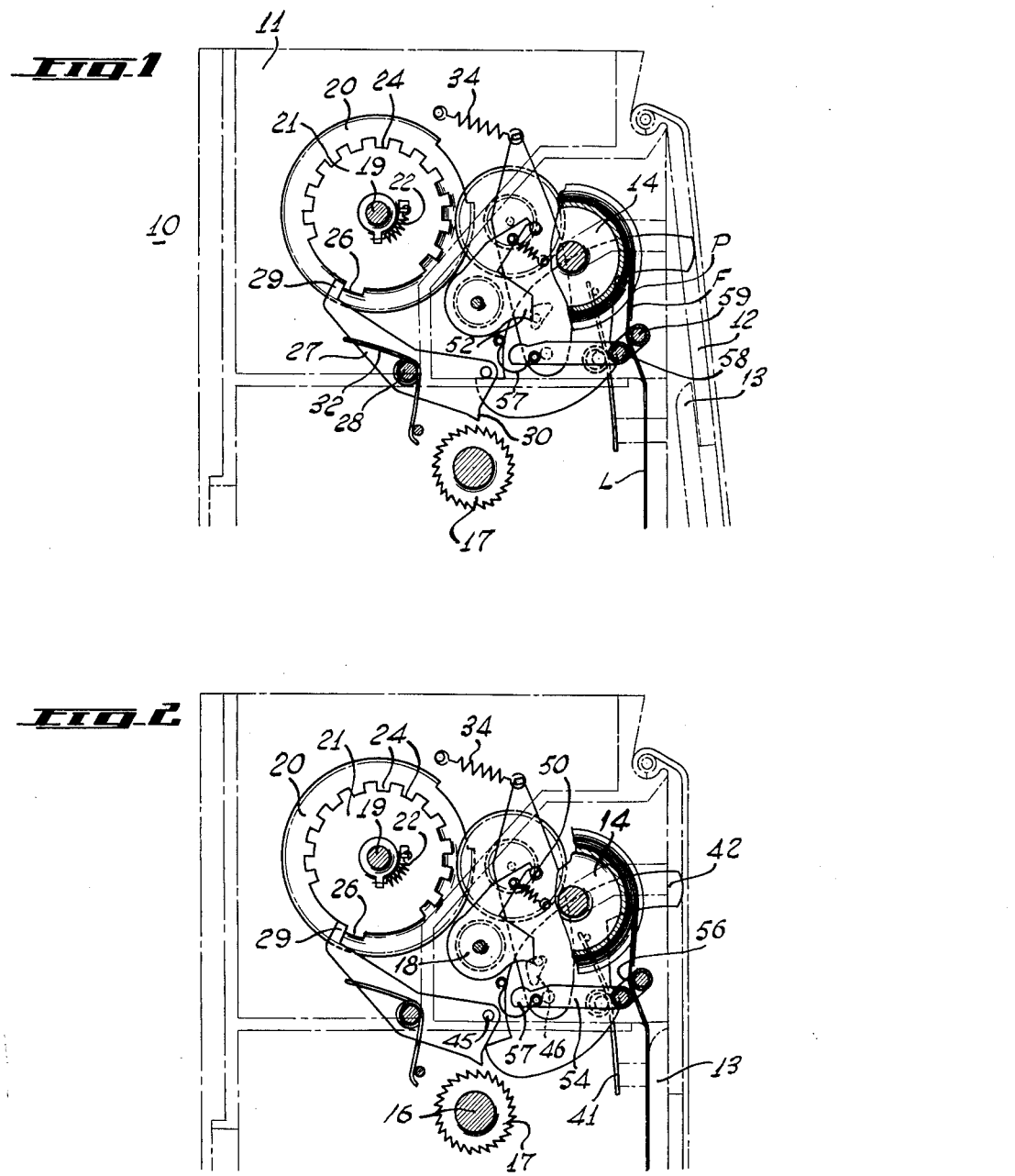

Filed Nov. 4, 1959  3 Sheets-Sheet 2

INVENTOR
TŌRU MIYASAKA
By Stanley Wolder
ATTORNEY

May 23, 1961 TŌRU MIYASAKA 2,985,083
FILM FRAME COUNTING MEANS
Filed Nov. 4, 1959 3 Sheets-Sheet 3

INVENTOR
TŌRU MIYASAKA
By Stanley Welch
ATTORNEY

United States Patent Office 2,985,083
Patented May 23, 1961

2,985,083
FILM FRAME COUNTING MEANS
Tōru Miyasaka, Okaya-shi, Nagano-ken, Japan, assignor to Yashica Co., Ltd., Tokyo, Japan, a corporation of Japan
Filed Nov. 4, 1959, Ser. No. 850,834
Claims priority, application Japan Dec. 6, 1958
10 Claims. (Cl. 95—31)

The present invention relates generally to improvements in photographic cameras and it relates more particularly to an automatic film frame counting mechanism in photographic cameras employing the conventional paper backed film having a paper leader.

The conventional cameras employing rolls of paper backed film are either of the non-automatic type wherein the film advance is gauged by visually observing through a window in the back of the camera appropriate designations carried by the film paper backing or of the automatic film transport type wherein the gauging of the film frame advance is automatic and a counter member designates the frame number. In loading the automatic film transport camera of the conventional type it is necessary to properly match the start of the film with the start of the gauging and counting procedure. In many forms of paper backed film the paper leader is provided with a starting mark which must be lined up with an indicator on the camera before initiating the counting and gauging operation, which in the case of twin reflex cameras is effected upon the closing of the camera back. In the event that the lining up step is improperly performed or is inadvertently omitted not only is film wasted but some valuable photographs may be lost. Furthermore, some films are not provided with a starting mark in which case the camera must be provided with a window through which to observe the registering of the first film frame. It is apparent from the above that the proper operation of the automatic counting and gauging film transport of the above type requires some degree of skill and experience, is time consuming, is frequently subject to error and otherwise leaves much to be desired.

It is therefore a principal object of the present invention to provide an improved photographic camera.

Another object of the present invention is to provide an improved automatic film transport and frame counting mechanism in a camera employing a roll of paper backed film.

A further object of the present invention is to provide an improved automatic film transport and counting device for paper backed film in which the initial setting of the film is obviated.

Still a further object of the present invention is to provide an improved camera mechanism of the above nature characterized by its ruggedness, reliability, ease of operation and low cost.

The above and other objects of the present invention will become apparent from a reading of the following description taken in conjunction with the accompanying drawings wherein:

Figure 1 is a side elevational view, partially in section and partially broken away, of a film transport mechanism embodying the present invention shown in initial loading position with the camera illustrated in broken line and the back cover thereof open;

Figure 2 is a view similar to Figure 1 with the back cover in closed position;

Figure 3:
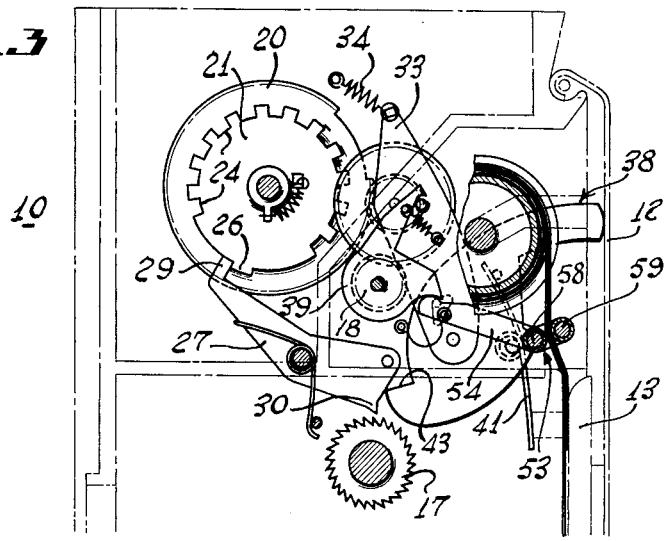
Figure 3 is a view similar to Figure 1 illustrating the counting mechanism in an actuated position.
Figure 4:
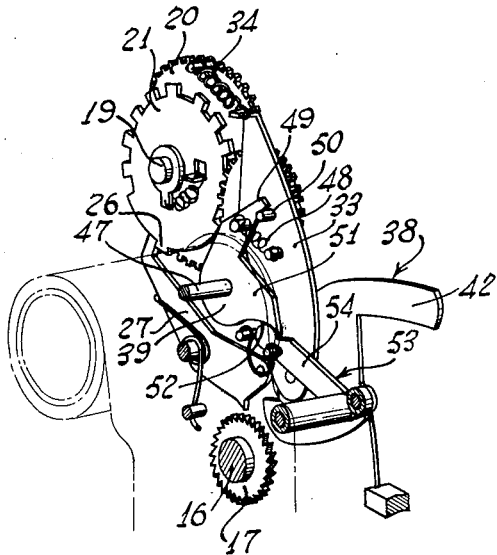
Figure 4 is a side fragmentary perspective view of the improved mechanism.
Figure 5:
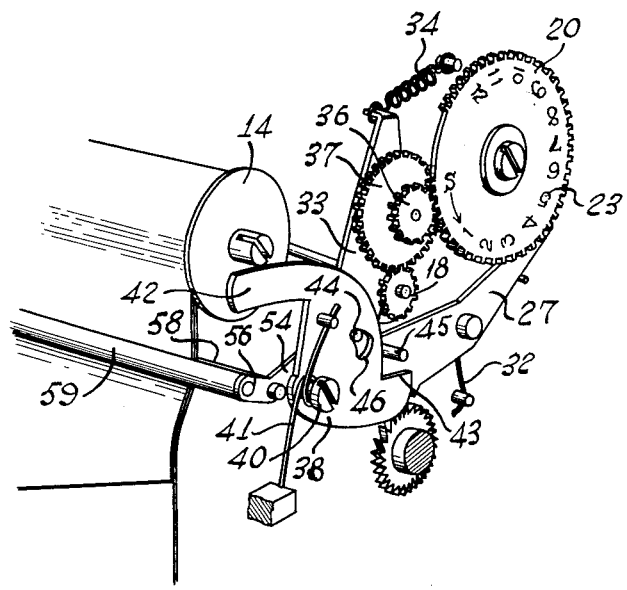
Figure 5 is a side fragmentary perspective view opposite to Figure 4.

In a sense, the present invention contemplates the provision of a film transport mechanism in a camera employing a film having a leader projecting forward of the leading end of said film, comprising a movable index member, means driving said index member in accordance with the advance of said film and movable between an active and inactive position and means responsive to said film for urging said drive means to active position.

According to a preferred form of the present invention the improved mechanism includes a pair of coaxial coupled index wheels, one defining a film frame counting gear and the other having a recessed periphery and controlling the film frame increment advance. The camera is provided with the conventional film feed spool and film take up spool, the latter being driven through a hand driven shaft carrying a ratchet wheel, and a film engaging and measuring friction wheel connected to a drive gear. A clutch defining gear train is carried on a lever and is rockable between an engage position coupling the drive gear and the frame counter gear and a disengage position decoupling said gears, and is spring urged to an engage position. First and second latch levers releasably lock the clutch lever in a disengage position and are each movable between a lock and unlock position. The first latch member is actuated by the closing of the camera lid to an unlock position and the second latch member is actuated to an unlock position by a rockable tripping lever carrying a snubbing rod located in the path of the film and motivated upon engagement by the film to urge the second latch member to an unlock position. Both latch members are spring urged to lock positions.

Referring now to the drawings which illustrate a preferred embodiment of the present invention the reference numeral 10 generally designates a camera of the twin lens reflex type including a body member 11 and a rear cover or lid 12, hinged at its upper edge to the body member 11 to afford access into the interior of the camera to permit the loading and unloading thereof. A resiliently mounted pressure plate 13 is located on the inner face of the lid 12. Means are provided in the usual manner to freely rotatably support a spool of film F provided with the usual paper backing P having a leader L extending forward of the leading edge of the film F. At the opposite end of the camera there is provided a film take up spool which is positively driven through a hand rotated shaft 16 in the conventional manner, the shaft 16 having axially affixed thereto a ratchet wheel 17. In passing from the feed spool 14 to the take up spool the film F traverses a path in registry with the camera window and urged thereto by pressure plate 13. A film measuring friction wheel, not shown, of well known construction and disposition is urged into driven engagement with the film in a conventional fashion and is coupled to and positively rotates a suitably mounted drive gear 18 in accordance with the film advance.

Rotatably mounted on an axle 19 located adjacent to the forward upper corner of the camera body member 11 are rigidly connected coaxial film frame counter index wheel 20 and film frame increment advance control index wheel 21. The index wheels 20 and 21 are normally urged clockwise to a retracted position by a helical tension spring 22 extending from a pin on the index wheel 21 to a stationary lug mounted on the axle 19. The counter wheel 20 is peripherally serrated to define a gear and has numbers 23 imprinted on its outer face and visually accessible from the outside of the camera to afford an indication of the window registering film frame. Formed in the periphery of the index wheel 21 for approximately three-quarters its circumference are a plurality of regularly spaced notches or rectangular recesses 24 corresponding in number to the number of frames carried by the film. Projecting radially outwardly from the periphery of the index wheel 21, between the end notches 24 is a detent 26.

A film take-up locking lever 27 is rockably mounted on a pin 28 below the index wheel 21 and is provided at one end thereof with a laterally projecting finger 29 and at its opposite end with a pawl defining hook element 30. A wire hair-pin spring 32 registering with the pin 28 has one leg engaging an arm of the lever 27 and the other leg entrapped by a stationary abutment to resiliently urge the lever 27 clockwise as seen in Figure 1 of the drawing, bringing the finger 29 into engagement with the periphery of the index wheel 21. The full rotation of the index wheel 21 is limited by the finger 29 engaging opposite faces of the detent 26 and increment advance thereof is controlled by the finger 29 engaging successive notches 24. As the finger 29 enters into registry with a notch 24 the hook element 30 swings into engagement with the ratchet wheel 17 to prevent further rotation thereof and the film take-up drive shaft 16. In order to permit the advance of the film a further frame the lever 27 is swung counterclockwise in any well known manner, permitting the rotation of the shaft 16 until the finger 29 engages the next successive notch 24 upon rotation of the index wheel 21 as will be hereinafter set forth.

In order to drive the index wheels 20 and 21 with the advance of the film there is provided a disengageable coupling clutch which includes an upwardly directed clutch arm or lever 33 suitably rockably supported adjacent its lower end between an advanced and retracted position and resiliently urged counter-clockwise to its advanced position as seen in Figure 3 of the drawing, by a helical tension spring 34 extending from the upper end of the arm 33 to a camera body carried support element. Mounted on the clutch arm 33 is a speed reduced gear train comprising a pair of connected coaxial small and large gears 36 and 37 respectively, the gear 37 engaging the drive gear 18 and the gear 36 engaging the counter wheel gear 20 when the clutch arm 33 is in its advance engage position and disengaging these gears when the clutch arm 33 is in its retracted disengage position as illustrated in Figure 1 of the drawings.

A pair of latch levers 38 and 39 respectively, releasably lock the clutch arm 33 in a retracted disengage position, the latch levers 38 and 39 being rockable about corresponding pivots between advanced unlock positions and retracted lock positions. The latch lever 38 is swingably mounted on a screw pin 40 and is resiliently urged to its retracted position by a hairpin spring 41 engaging the pin 40 and having one leg abutting a pin carried by the latch lever 38 and another leg engaging a stationary abutment. Projecting rearwardly from the upper end of the lever 38 is a finger 42 whose free end abuts the inner face of the camera lid 12 and located at its forward end is an upwardly directed shoulder 43 which cooperates with a pin 45 mounted on the rear upper corner of the lever 27 to releasably lock the pawl element 30 out of engagement with the ratchet wheel 17 to permit the free take up of the film, and the finger 29 out of engagement with the notches 24 so that the index wheels may rotate to their retracted position. A lost motion coupling is effected between the latch lever 38 and the clutch arm 33 by way of a pin 44 mounted on the lever 33 and registering with an elongated slot 46 formed in the lever 38. When the lid 12 is open the spring 41 swings the lever 38 to its retracted position, the forward edge of the slot 46 engaging the pin 44 to lock the lever 33 in its retracted disengage position. As the lid 12 is closed it rotates the lever 38 by way of the finger 42 to its forward unlock position permitting the forward movement of the pin 44 in slot 46 and the advance of the clutch lever 33 to its engage position.

The second latch lever 39 is rockable about the shaft 47 between a forward unlock position and a retracted lock position and is resiliently urged clockwise to its retracted position by a helical spring 48 extending from an upwardly directed arm 49 of the lever 39 to stationary element. The trailing edge of the lever arm 49 engages a pin 50 mounted in the clutch lever 33 and maintains the clutch lever 33 in its retracted disengage position when the lever 39 is in its retracted lock position. The lever 39 is also provided with a lower rearwardly projecting leg 51 having a terminating downwardly directed shoulder 52. Thus the clutch arm 33 assumes its advance engage position only when both latch levers 38 and 39 are in their advance unlock positions.

In order to swing the latch lever 39 to its unlock position in response to the leading edge of the film F there is provided an angulated tripping lever 53 including a forwardly directed arm 54 and a rearwardly upwardly inclined arm 56, the arms 54 and 56 being joined by a pivoted knee portion. The upper rounded edge of the free end of the lever arm 54 is swingable into engagement with the downwardly directed latch lever shoulder 52. The tripping lever 53 is swingable past dead center to a retracted or advanced position by a U-shaped wire toggle spring 57 connected between the free end of the lever arm 54 and a stationary element. Thus the spring 57 swings the lever to its fully retracted or advanced position as the lever is rotated past dead center counterclockwise or clockwise, respectively.

A pair of laterally extending longitudinally spaced parallel snubbing rods or rollers 58 and 59 are mounted at the knee portion of the lever 53 and free end of the lever arm 56 respectively. When the tripping lever 53 is in its retracted position the lever arm 56 is highly upwardly inclined so that the film extending from the roll 14 to the camera window is sharply deflected by the roller or rod 59 from its linear path. The roller 59 is then so located that the pressure exerted by the advancing leader L is insufficient to advance rotate the tripping lever 53 past its dead center position. However, upon the film F passing between the rollers 58 and 59, by reason of the greater resistance to flexing by the combined film F and backing B the counterclockwise pressure exerted by the advancing film is sufficient to swing the tripping lever past dead center to its advanced position, whereupon the leading end of the lever arm 54 acts on the latch lever shoulder 52 to swing the latch lever 39 to its advanced unlock position.

Considering now the operation of the improved camera described above, upon the opening of the lid 12, as shown in Figure 1 of the drawing, the latch lever 38 is swung outwardly by the spring 41 to draw the clutch lever 33 by way of the pin 44 to a disengage position whereby the gears 36 and 37 are uncoupled from the gears 20 and 18 and to lock the lever 27 by way of the pin 45 and shoulder 43 out of engagement with the ratchet wheel 17 and wheel notches 24. The index wheels 20 and 21 are thus rotated by the spring 22 to their clockwise retracted positions as limited by the finger 29 and detent 26 and the film take-up roll may be freely rotated. The tripping lever 53 is swung counterclockwise to its retracted position. A roll 14 of film is loaded in the camera 10 in the usual manner, the leader L being passed between the rollers 58 and 59 and brought into engagement with the take-up roll. The lid 12 is then closed swinging the lever 38 to its unlock position to effect the release of the clutch arm 33 therefrom and to release the lever 27. The shaft 16 and ratchet wheel 17 are then rotated to take up the film. Upon the film F reaching and passing between the rollers 58 and 59 it imparts a clockwise torque to the tripping lever 53, as aforesaid, sufficient to rotate the lever 53 past dead center whereby the spring 57 urges it to its advance position so that the arm 54 presses on shoulder 52 to urge the latch lever 39 to its unlock position. The clutch lever 33 is thus completely released and is swung by the spring 34 to an engage position, the gears 36 and 37 coupling the drive gear 18 to the index wheel gear 20. Upon further take-up of the film the index wheels 20 and 21 are rotated in accordance with the film advance, being motivated by the film measuring friction wheel through the aforesaid gears. When the first film frame registers with the camera window, the index wheel 21 has advanced the distance from the detent 26 to the first notch 24, bringing the notch into registry with the lever finger 29 which moves into engagement with the first notch 24, the lever 27 swinging clockwise to bring the element 30 into engagement with the ratchet wheel 17 thereby preventing further advance of the film. The first film frame is now ready for exposure and the counter wheel has been rotated so that the numeral 1 thereon registers with a suitable indicator. Following the exposure of the first film frame, the lever 27 is swung counterclockwise to carry the finger 29 out of the first notch 24 and to disengage the ratchet wheel 17, the film then being taken up another frame until the take-up is locked by the lever 27 when the finger 29 engages the next successive notch 24. The above procedure is repeated until the film is completely exposed whereby the last notch 24 is passed and the final winding of the film permitted since the lever 27 is maintained in a ratchet disengaged position by reason of the finger 29 engaging the trailing periphery of the index wheel 21. The exposed roll of film may then be removed and the camera reloaded in the manner above set forth.

It is apparent from the above that there has been provided by the present invention a completely automatic film counting and gauging mechanism for cameras employing the conventional roll of paper backed film, wherein the initial setting of the film has been completely obviated.

While there has been described and illustrated a preferred embodiment of the present invention it is apparent that numerous alterations, omissions and additions may be made without departing from the spirit thereof.

What is claimed is:

1. A film transport mechanism in a camera having a rotatable film measuring member and employing a film provided with a backing member and leader and movable along a predetermined path in the camera, comprising an index wheel, a disengageable clutch coupling said index wheel to said measuring member and spring urged to an engage position, a latch member releasably locking said clutch in a disengage position and movable between a lock and unlock position, a tripping lever swingable between an advanced and retracted position and urging said latch member to unlock position upon movement of said tripping lever to its advanced position, a pair of longitudinally spaced transversely extending parallel snubbing rods mounted on said lever and disposed in the path of said film and defining a guide slot directed at an angle to the path of said film when said tripping lever is in retracted position whereby to deflect said film from its normal path, said film engaging said snubbing rods and urging said tripping lever toward its advanced position.

2. A film transport mechanism in accordance with claim 1 wherein said index wheel includes a gear and said film measuring member is connected to a drive gear and said clutch member comprises a lever carrying a gear train rockable between positions in coupling engagement and disengagement with said index wheel gear and said measuring member drive gear.

3. A film transport mechanism in accordance with claim 1 wherein said index wheel comprises a number carrying disc.

4. A film transport mechanism in accordance with claim 1 wherein said camera includes a film winding shaft carrying a ratchet wheel and said index wheel has regularly spaced notches formed in the periphery thereof and including a pawl member spring urged toward engagement with said ratchet wheel and having a finger engaging said index wheel periphery, said pawl member engaging said ratchet wheel only when said finger registers with a notch in the index wheel.

5. A film transport mechanism in a camera having a film winding member and lid movable between open and closed positions and rotatable film driving member connected to a drive gear and employing a film provided with a backing member and leader and advanced along a predetermined path in said camera, comprising a film counting wheel rotatable between an advanced and retracted position and having an index gear defining toothed periphery rotatable therewith, a clutch lever carrying a gear train movable into and out of coupling engagement with said drive gear and index gear, and spring urged into an engage position, a first latch member releasably locking said clutch lever in a disengage position, a tripping lever swingable between an advanced and retracted position and urging said first latch member to unlock position upon movement of said tripping lever to its advanced position, a pair of longitudinally spaced transversely extending parallel snubbing rods mounted on said tripping lever and disposed in the path of said film and defining a guide slot directed at an angle to the path of said film when said tripping lever is in retracted position whereby to deflect said film from its normal path, said film engaging said snubbing rods and urging said tripping lever toward its advanced position, and a second latch member releasably locking said clutch lever in a disengage position and movable by the closing of said camera lid to an unlock position.

6. A film transport mechanism in accordance with claim 5 wherein said second latch member is coupled to said clutch lever by a lost motion connection.

7. A film transport mechanism in accordance with claim 5 including means, releasable by the movement of said second latch member to unlock position, normally locking said film winding member.

8. A film transport mechanism in accordance with claim 5 including means releasably locking said counting wheel in successive predetermined angular increments and spring means urging said counting wheel to its retracted position.

9. A film transport mechanism in accordance with claim 8 including means responsive to the movement of said second latch member to a lock position urging said counting wheel locking means to a release position.

10. A film transport mechanism in accordance with claim 5 including a peripherally notched index wheel rotatable with said counting wheel, and a lever rockable into locking engagement with said film winding member and having a finger engaging said index wheel periphery.

References Cited in the file of this patent

UNITED STATES PATENTS

| | | |
|---|---|---|
| 2,539,764 | Wisegarver | Jan. 30, 1951 |
| 2,548,172 | Pollock | Apr. 10, 1951 |
| 2,879,704 | Winkler et al. | Mar. 31, 1959 |